(12) United States Patent
Freund et al.

(10) Patent No.: US 10,756,978 B2
(45) Date of Patent: Aug. 25, 2020

(54) CLOUD-BASED COMPARISON OF DIFFERENT REMOTE CONFIGURATIONS OF A SAME SYSTEM

(71) Applicant: SAP SE, Walldorf (DE)

(72) Inventors: Barbara Freund, Malsch (DE); Wulf Kruempelmann, Altlussheim (DE)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 15/996,661

(22) Filed: Jun. 4, 2018

(65) Prior Publication Data
US 2019/0372846 A1  Dec. 5, 2019

(51) Int. Cl.
*H04L 12/24*   (2006.01)
*G06F 16/00*   (2019.01)
*G06F 16/20*   (2019.01)

(52) U.S. Cl.
CPC .......... *H04L 41/0866* (2013.01); *G06F 16/00* (2019.01); *G06F 16/20* (2019.01); *H04L 41/0853* (2013.01)

(58) Field of Classification Search
CPC .......... G06F 9/445; G06F 16/00; G06F 16/20; G06Q 10/00; H04L 41/0853; H04L 41/0866
See application file for complete search history.

(56) References Cited

U.S. PATENT DOCUMENTS

| | | | |
|---|---|---|---|
| 5,819,268 A * | 10/1998 | Hackett | G06F 16/284 707/690 |
| 6,868,427 B2 | 3/2005 | Herzog et al. | |
| 8,332,462 B2 | 12/2012 | Kruempelmann | |
| 8,572,156 B2 | 10/2013 | Kruempelmann et al. | |
| 8,572,565 B2 | 10/2013 | Bozak et al. | |
| 8,924,530 B2 | 12/2014 | Kruempelmann | |
| 9,201,700 B2 | 12/2015 | Kruempelmann | |
| 9,430,219 B2 | 8/2016 | Kruempelmann et al. | |
| 9,792,342 B2 | 10/2017 | Kruempelmann | |
| 9,870,542 B2 | 1/2018 | Kruempelmann et al. | |
| 2010/0082518 A1* | 4/2010 | Gaffga | G06F 9/44505 706/47 |
| 2011/0179008 A1* | 7/2011 | Talius | G06F 16/217 707/708 |
| 2013/0117710 A1 | 5/2013 | Walter et al. | |
| 2014/0149568 A1 | 5/2014 | Kruempelmann et al. | |
| 2014/0156813 A1* | 6/2014 | Zheng | H04L 67/16 709/220 |

* cited by examiner

*Primary Examiner* — Chirag R Patel
(74) *Attorney, Agent, or Firm* — Fish & Richardson P.C.

(57) ABSTRACT

The disclosure generally describes methods, software, and systems for comparing different configurations of the same system. A query for determining differences between a first system and a different second system is received at a central server. Both systems are remote from the central server and have configurations related to a particular application. Using stored metadata at the central server, a difference is determined between a first customized configuration of the first system and a different second customized configuration of the different second system. The stored metadata identifies tables defining a scoping of each of the first system and the different second system. The difference is provided by the central server in response to the received query.

14 Claims, 4 Drawing Sheets

CLOUD-BASED COMPARISON OF DIFFERENT REMOTE CONFIGURATIONS OF A SAME SYSTEM

BACKGROUND

The present disclosure relates to comparing different configurations of the same system. For example, separate versions or configurations of the same system may exist at different locations, or may be used for different purposes. A productive system, which may be accessible through the cloud, may be in use by customers. At the same time, a development, quality assurance (QA), or test system may also be in use, for example, at a remote location. Changes made in one system may not be replicated immediately in the other system, and the versions may be out of sync.

SUMMARY

This disclosure generally describes computer-implemented methods, software, and systems for comparing different configurations of the same system. One computer-implemented method includes: receiving, at a central server, a query for determining differences between a first system and a different second system, both systems remote from the central server and having configurations related to a particular application; determining, using stored metadata at the central server, a difference between a first customized configuration of the first system and a different second customized configuration of the different second system, wherein the stored metadata identifies tables defining a scoping of each of the first system and the different second system; and providing, by the central server in response to the received query, the difference.

The foregoing and other implementations can each optionally include one or more of the following features, alone or in combination. In particular, one implementation can include all the following features:

In a first aspect, combinable with any of the previous aspects, the method further comprising: receiving the metadata from each of the first system and the different second system; and temporarily storing the metadata at the central server.

In a second aspect, combinable with any of the previous aspects, wherein the metadata includes a projection view for each table of the first system and the different second system, each table containing configuration data and scoping data, and wherein determining the difference includes comparing the metadata for the first system and the different second system.

In a third aspect, combinable with any of the previous aspects, wherein the metadata identifies relationships between the scoping data and existing database tables.

In a fourth aspect, combinable with any of the previous aspects, wherein the scoping data identifies building blocks for the configurations, each building block identifying related views and adoption data for at least one of the existing database tables.

In a fifth aspect, combinable with any of the previous aspects, wherein the difference identifies specific tables that are in specified ones of just the first system or the different second system.

In a sixth aspect, combinable with any of the previous aspects, wherein the query in a form of a difference between the first system minus the different second system.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for comparing different configurations of the same system. For example, the different configurations of the same system can include a configuration that is available to customers through the cloud. Cloud systems can be controlled by a service provider system, which can have a connection to all cloud systems. Comparisons of the different configurations of the same system can be performed, for example, by applications that use the service provider system as a platform.

Advantages of the techniques described in the present disclosure include the following. First, using scoping to identify only the information needed for a comparison can reduce the amount of data that needs to be transferred from a system to the central service provider that performs the comparison. For example, metadata alone can be compared instead of needing to compare hundreds or thousands of individual tables. Second, manual processes for identifying differences in configurations can be replaced with automatic processes. Third, a system different from the productive system can be used for the comparison, which can reduce the load on the productive system. Fourth, the use of database technology to perform the comparison can reduce the system requirements.

Since the central service provider system can be based on a database-related architecture, database technologies can be used to fetch the configuration data from the systems to the central service provider. In some implementations, the configuration data can be pushed to the central service provider. For example, pushing can occur automatically, such as on a schedule or when updates to the configuration data occur.

For each database table that corresponds to a configuration, a projection view can be created from the remote database to the central service provider. The production view can provide a high-level definition as to the layout of the data. As an example, two systems can exist, each having a different configuration of the same data. A quality assurance (QA) system, for example, can be a version of the system currently being tested, such as prior to a pending release of a new version of the system. A production (PRD) system, for example, can be a version of the system that is currently being used, such as available in the cloud for use by customers at remote locations.

In some implementations, a database table (for example, TAB) can include definitions for the QA system projection view (for example, TAB#QA) as the link from the QA system. A database table (for example, TAB#PRD) can include definitions for the PRD system projection view as the link for the productive system. The projection views can use remote database access technology to automatically access the QA and PRD systems. The access can be done for all tables containing configuration data and scoping data for the customer.

Figure 1:
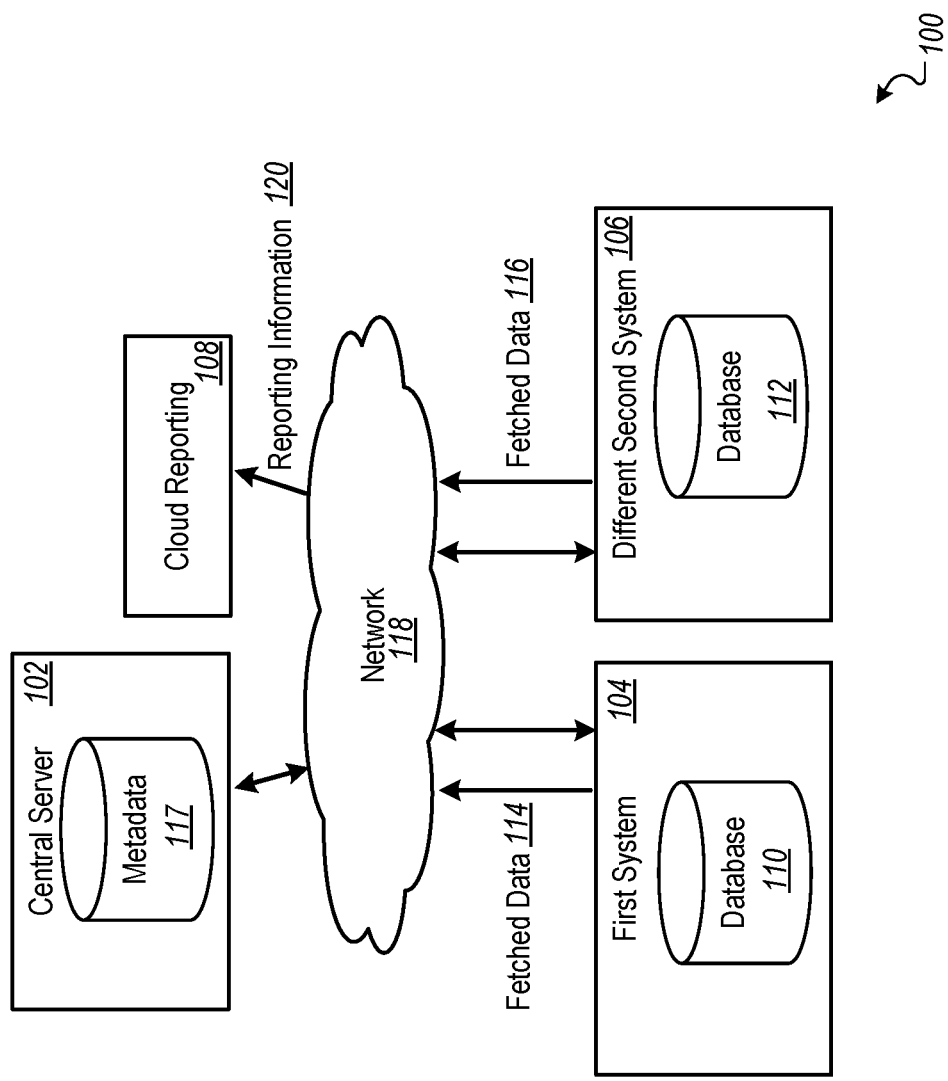
FIG. 1 is a block diagram of an example of a system or performing a cloud-based comparison of different remote configurations of a same system.

FIG. 1 is a block diagram of an example of a system 100 for performing a cloud-based comparison of different remote configurations of a same system. A central server 102 can serve as a central service provider system that can compare the configurations of two systems. For example, the central server 102 can compare the configurations of a first system 104 and a second system 106. The results of the comparison can be provided for cloud reporting 108, such as a central website that publishes comparisons of systems that use a common application. In some implementations, the results of the comparison can be provided to a client terminal of a user who issued a request for the comparison.

The comparison can be based on a comparison of projection views of data in database 110 and 112, corresponding to systems 104 and 106, respectively. In order to be able to make the comparison, fetched data 114 and 116, received from the systems 104 and 106, respectively, can be stored at the central server 102, such as in metadata 117. The fetched data can include an amount of data that is sufficient for making the comparison. Information that is transferred throughout the system 100 can pass through a network 118, such as a network that includes the Internet. The information that passes through the network 118 can also include reporting information 120, which identifies the results of a given comparison.

When a comparison of two different configurations of the same system is to be performed, scoping data from both systems can be selected, and the content of the projection views associated with the scoping data from both systems can be compared. If differences are found, then a notification can be made. In some implementations, a notification can be provided indicating that two or more configurations have been compared and have been determined to be the same. This can occur, for example, at a time at which the QA version is to go live, replacing the PRD system. Alternatively, the comparison can take place at any other time to identify relevant differences between the systems.

The scoping data can be used to select the metadata associated with each configuration. For example, the metadata can connect (for example, by way of defined relationships) the scoping data to existing database tables, including identifying information from at least one data dictionary that corresponds to each configuration. Using the information from the tables, data can be selected for the projection views (for example, TAB#QA and TAB#PRD) or other equivalent views or database views for each configuration. Content from these tables can be used to perform the comparison of the different configurations. The result of the comparison can be stored and reported using a cloud reporting system that is available to operations teams and customers. As a result, at any given time, the results of the comparison can be available. For results provided to the customer, table content can be re-translated in order to identify, to the customer, the corresponding data and view used by the customer, such as to enter the data into the system.

Figure 2:
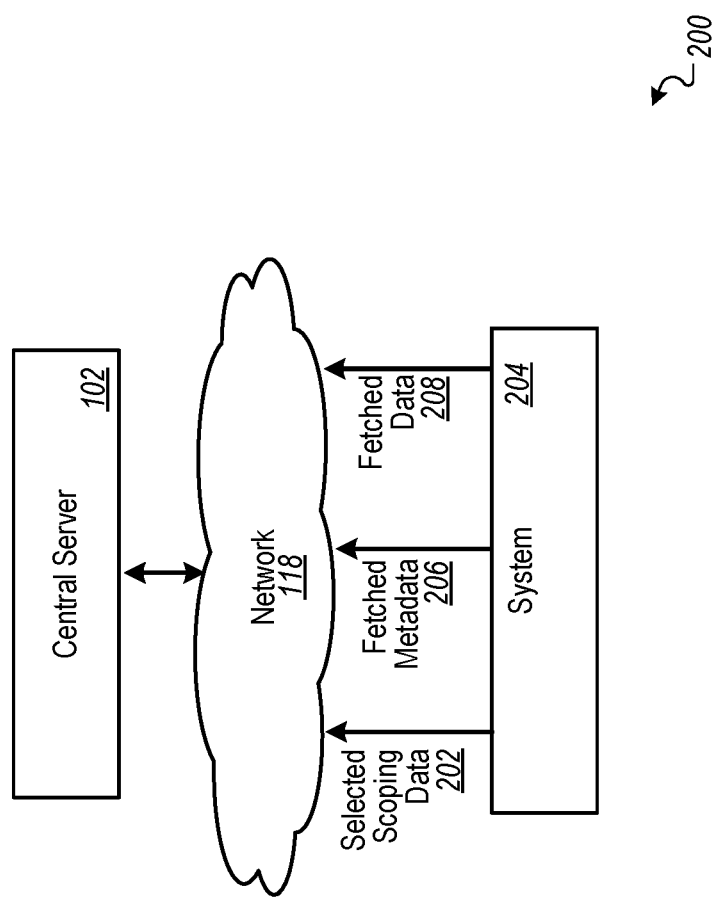
FIG. 2 is a block diagram of an example of a system for receiving scoping data and corresponding metadata from a system.

FIG. 2 is a block diagram of an example of a system 200 for receiving scoping data and corresponding metadata from a system. The central server 102 can receive selected scoping data 202 from a system 204 (for example, the different second system 106) that identifies selected building blocks and customer adaptations to the building blocks. Using the scoping data, the central server 102 can receive fetched metadata 206 that corresponds to the scoping data. The metadata can be used to identify the building blocks, including related views and the customer adaptations and information identifying the connections to the customer adaptations. Using the metadata 206, the central server 102 can receive fetched data 208 that corresponds to the fetched metadata 206. As soon as all of the data is obtained by or stored at the central server 102, the central server 102 can, at any time (for example, at the first step of the comparison), respond to a query for determining the difference between the system 204 and another system that may have the same or a different configuration. Building blocks can combine block information about complex reusable business-related data blocks spread over several database tables.

Figure 3:
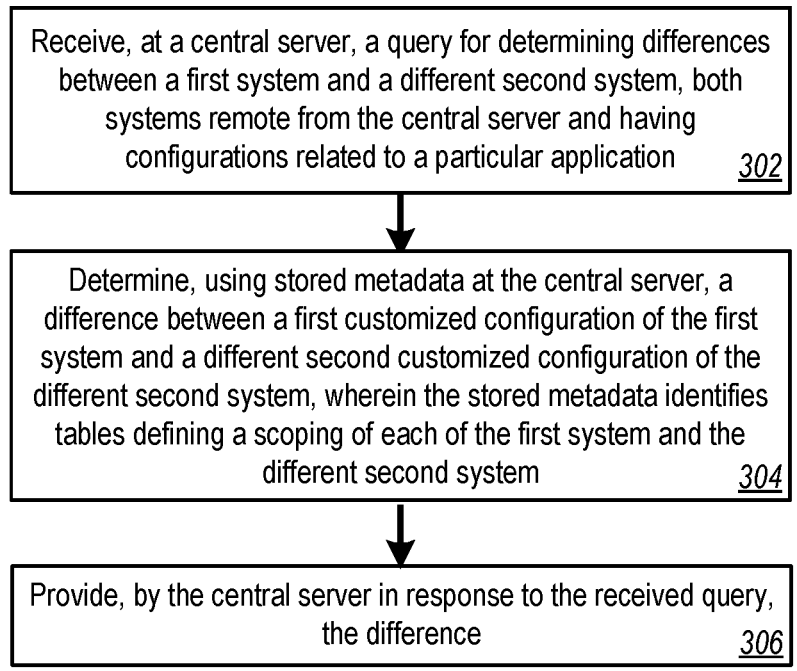
FIG. 3 is a flowchart of an example method for determining differences in configurations of the same system.

FIG. 3 is a flowchart of an example method 300 for determining differences in configurations of the same system. Method 300 can be performed by the system 100, for example. For clarity of presentation, the description that follows generally describes method 300 in the context of FIGS. 1 and 2.

At 302, a query is received at a central server. The query can be formulated for determining differences between a first system and a different second system, both systems being remote from the central server and having configurations related to a particular application. In some implementations, the query can be in a form of a difference between the first system minus the different second system. For example, the query can be formulated as SELECT*FROM TAB#PRD−SELECT*FROM TAB#QA.

At 304, a difference is determined between a first customized configuration of the first system and a different second customized configuration of the different second system. The determining can use, for example, stored data at the central server 102 that identifies tables defining a scoping of each of the first system and the different second system.

At 306, the difference is provided by the central server in response to the received query. For example, the central server 102 can provide information that identifies the difference in the configurations stored at the first system 102 and the different second system 104. The difference can identify specific tables that are in specified ones of either the first system 102 or the different second system 104. The difference can identify specific customizations, for example, settings, etc., that users have made to customize the system. The identified customizations can identify specific users who have made specific customizations. The identified customizations can also identify groups of tables, such as related tables, that are part of a customization.

In some implementations, a user interface can be used to present a report that includes information identifying differences between the first customized configuration of the first system and the different second customized configuration of the different second system. For example, the report can include lines or entries that identify a particular customizing object (or building block). The report can present, for each customizing object (or building block), a description of the business process, and a result of a comparison. Comparison results can indicate, for example, that the particular customizing object is equal in both systems or includes more or different entries in one system or the other. For example, the report can identify the number of entries in each system. In some implementations, the user can be presented with additional information by performing an action in the user interface. For example, a click on a particular line in the report can cause presentation of more detailed information that is presented, for example, in a detail screen with each entry. The details that are presented can include all of the complete information for the entry or only the differences.

In some implementations, the method 300 can further include receiving the metadata from each of the first system and the different second system and storing the metadata at the central server. For example, the metadata can include a projection view for each table of the first system 104 and the different second system 106, each table containing configuration data and scoping data. Determining the difference can include comparing the metadata for the first system and the different second system. The received metadata can be stored at the central server 102 as the metadata 117. The metadata can identify relationships between the scoping data and existing database tables, where the scoping data can identify building blocks for the configurations. Each building block can identify related views and adoption data for at least one of the existing database tables.

In some implementations, customization of the system can occur using an application, such as a solution builder or an integrated development environment (IDE). In such applications, changes to configurations can be tracked automatically, including the generation and storage of metadata that corresponds to building blocks that are part of the configuration.

In some implementations, differences in configurations that are reported can be provided in a service provider cockpit, a dashboard, or some other tool. The reported information can identify levels of differences (for example, a count of a number of tables that are different) and date/time information identifying when two compared configurations became different.

Figure 4:
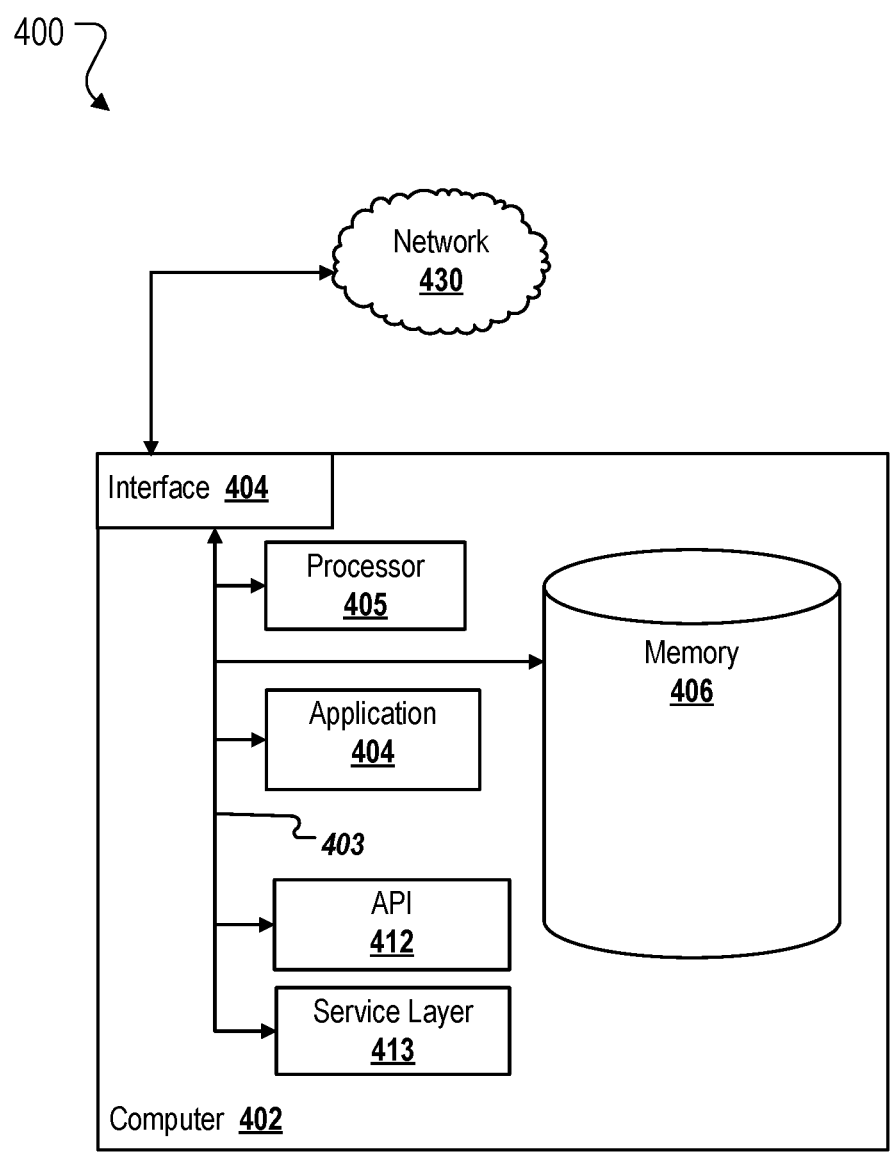
FIG. 4 is a block diagram of an exemplary computer system used to provide computational functionalities associated with described algorithms, methods, functions, processes, flows, and procedures as described in the instant disclosure.

FIG. 4 is a block diagram of an exemplary computer system 400 used to provide computational functionalities associated with described algorithms, methods, functions, processes, flows, and procedures as described in the instant disclosure.

The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an API 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of the instant disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving, at a central server, a query for determining differences between a first cloud-based system and a different second cloud-based system, both cloud-based systems remote from the central server and having configurations related to a particular application;

receiving metadata from each of the first cloud-based system and the different second cloud-based system;

temporarily storing the metadata at the central server;

determining, using the stored metadata at the central server, a difference between a first customized configuration of the first cloud-based system and a different second customized configuration of the different second cloud-based system, wherein the stored metadata identifies tables defining a scoping of each of the first cloud-based system and the different second cloud-based system, including a projection view for each table of the first cloud-based system and the different second cloud-based system, each table containing configuration data and scoping data, and wherein determining the difference includes comparing the metadata for the first cloud-based system and the different second cloud-based system; and providing, by the central server in response to the received query, the difference.

2. The computer-implemented method of claim 1, wherein the metadata identifies relationships between the scoping data and existing database tables.

3. The computer-implemented method of claim 2, wherein the scoping data identifies building blocks for the configurations, each building block identifying related views and adoption data for at least one of the existing database tables.

4. The computer-implemented method of claim 1, wherein the difference identifies specific tables that are in specified ones of just the first cloud-based system or the different second cloud-based system.

5. The computer-implemented method of claim 1, wherein the query is in a form of a difference between the first cloud-based system minus the different second cloud-based system.

6. A system comprising:
memory storing metadata including configuration information for different cloud-based systems; and
a central server performing operations comprising:
receiving, at the central server, a query for determining differences between a first cloud-based system and a different second cloud-based system, both cloud-based systems remote from the central server and having configurations related to a particular application;
receiving metadata from each of the first cloud-based system and the different second cloud-based system;
temporarily storing the metadata at the central server;
determining, using the stored metadata at the central server, a difference between a first customized configuration of the first cloud-based system and a different second customized configuration of the different second cloud-based system, wherein the stored metadata identifies tables defining a scoping of each of the first cloud-based system and the different second cloud-based system, including a projection view for each table of the first cloud-based system and the different second cloud-based system, each table containing configuration data and scoping data, and wherein determining the difference includes comparing the metadata for the first cloud-based system and the different second cloud-based system; and
providing, by the central server in response to the received query, the difference.

7. The system of claim 6, wherein the metadata identifies relationships between the scoping data and existing database tables.

8. The system of claim 7, wherein the scoping data identifies building blocks for the configurations, each building block identifying related views and adoption data for at least one of the existing database tables.

9. The system of claim 6, wherein the difference identifies specific tables that are in specified ones of just the first cloud-based system or the different second cloud-based system.

10. The system of claim 6, wherein the query is in a form of a difference between the first cloud-based system minus the different second cloud-based system.

11. A non-transitory computer-readable media encoded with a computer program, the computer program comprising instructions that when executed by one or more computers cause the one or more computers to perform operations comprising:
receiving, at a central server, a query for determining differences between a first cloud-based system and a different second cloud-based system, both cloud-based systems remote from the central server and having configurations related to a particular application;
receiving metadata from each of the first cloud-based system and the different second cloud-based system;
temporarily storing the metadata at the central server;
determining, using the stored metadata at the central server, a difference between a first customized configuration of the first cloud-based system and a different second customized configuration of the different second cloud-based system, wherein the stored metadata identifies tables defining a scoping of each of the first cloud-based system and the different second cloud-based system, including a projection view for each table of the first cloud-based system and the different second cloud-based system, each table containing configuration data and scoping data, and wherein determining the difference includes comparing the metadata for the first cloud-based system and the different second cloud-based system; and
providing, by the central server in response to the received query, the difference.

12. The non-transitory computer-readable media of claim 11, wherein the metadata identifies relationships between the scoping data and existing database tables.

13. The non-transitory computer-readable media of claim 12, wherein the scoping data identifies building blocks for the configurations, each building block identifying related views and adoption data for at least one of the existing database tables.

14. The non-transitory computer-readable media of claim 11, wherein the difference identifies specific tables that are in specified ones of just the first cloud-based system or the different second cloud-based system.

\* \* \* \* \*